(12) United States Patent
Allaire

(10) Patent No.: US 6,679,627 B1
(45) Date of Patent: Jan. 20, 2004

(54) SELF-FLOATING DEVICE FOR MEASURING THE TEMPERATURE OF LIQUIDS

(75) Inventor: Claude Allaire, St-Eustache (CA)

(73) Assignee: RDC Controle LTEE, Blainville (CA)

( * ) Notice: Subject to any disclaimer, the term of this patent is extended or adjusted under 35 U.S.C. 154(b) by 0 days.

(21) Appl. No.: 09/529,426

(22) PCT Filed: Nov. 3, 1998

(86) PCT No.: PCT/CA98/01025

§ 371 (c)(1),
(2), (4) Date: May 3, 2000

(87) PCT Pub. No.: WO99/23462

PCT Pub. Date: May 14, 1999

Related U.S. Application Data

(60) Provisional application No. 60/064,200, filed on Nov. 4, 1997.

(51) Int. Cl.[7] .............................. G01K 1/14; G01K 1/08; G01K 7/02; G01K 1/12

(52) U.S. Cl. ........................ 374/156; 374/179; 374/139; 374/140

(58) Field of Search .................. 374/179, 139, 374/140, 156; 266/91, 95, 94

(56) References Cited

U.S. PATENT DOCUMENTS

| | | | |
|---|---|---|---|
| 3,717,034 A | * 2/1973 | Dukelow et al. | 73/343 R |
| 4,335,734 A | * 6/1982 | Trinkwalder | 137/77 |
| 4,692,556 A | 9/1987 | Bollen et al. | 136/234 |
| 4,721,533 A | 1/1988 | Phillippi et al. | 136/234 |
| 4,842,418 A | * 6/1989 | Conti | 374/139 |
| 4,984,904 A | 1/1991 | Nakano et al. | 374/139 |
| 4,990,475 A | * 2/1991 | Matsumoto et al. | 501/120 |
| 5,037,211 A | 8/1991 | Nakashima et al. | 374/139 |
| 5,061,083 A | 10/1991 | Grimm et al. | 374/112 |
| 5,064,295 A | 11/1991 | Thill et al. | 374/139 |
| 5,069,553 A | 12/1991 | Phillippi | 374/140 |
| 5,071,258 A | 12/1991 | Usher et al. | 374/140 |
| 5,104,234 A | 4/1992 | Falk et al. | 374/140 |
| 5,147,137 A | 9/1992 | Thiesen | 374/139 |
| 5,181,779 A | * 1/1993 | Shia et al. | 374/139 |
| 5,197,805 A | 3/1993 | Wilson | 374/208 |
| 5,198,749 A | * 3/1993 | Guthrie et al. | 324/71.1 |
| 5,209,571 A | 5/1993 | Kendall | 374/139 |
| 5,230,565 A | 7/1993 | Aoki et al. | 374/185 |
| 5,232,286 A | 8/1993 | Dubreuil et al. | 374/139 |
| 5,237,844 A | 8/1993 | Duri | 72/13 |
| 5,348,395 A | 9/1994 | Corr, II et al. | 374/135 |

(List continued on next page.)

FOREIGN PATENT DOCUMENTS

| | | |
|---|---|---|
| DE | 3437417 | 4/1986 |
| GB | 2109482 A * | 6/1983 |
| GB | 2 176 611 | 12/1986 |
| GB | 2 196 430 | 4/1988 |

OTHER PUBLICATIONS

"Continuous Reading Molten Metal Temperature Sensor" Heraeus Electro–Nite Co. 1993 —Pamphlet.

"Method for Protecting Flux Line in Continously Temperature Measuring Protect Tube for Molten Steel in Tundis" Patent Abstracts of Japan, Pub No 04111951, 1992.

"Method for Continously Measuring Molten Steel Temperature in Tundish" Patent Abstracts of Japan, Pub. No 06079422, 1994.

*Primary Examiner*—G. Verbitsky
(74) *Attorney, Agent, or Firm*—Ogilvy Renault; Guy J. Houle

(57) ABSTRACT

A temperature sensor is supported in a device which floats in a liquid, the temperature of which is to be determined. Typically the sensor is the hot thermocouple element of a thermocouple and the liquid is a molten metal; the device may be constructed to float with the temperature sensor disposed at a desired distance below the upper surface of the liquid.

11 Claims, 4 Drawing Sheets

U.S. PATENT DOCUMENTS

| | | | |
|---|---|---|---|
| 5,360,269 A | 11/1994 | Ogawa et al. | 374/140 |
| 5,388,908 A | 2/1995 | Kendall | 374/140 |
| 5,456,761 A | 10/1995 | Auger et al. | 136/232 |
| 5,474,618 A | 12/1995 | Allaire | 136/234 |
| 5,520,461 A | 5/1996 | Curry et al. | 374/179 |
| 5,577,841 A * | 11/1996 | Wall | 374/140 |
| 5,593,559 A * | 1/1997 | Wiktorowicz | 204/453 |
| 5,618,594 A | 4/1997 | Tulloch et al. | 428/34.1 |
| 5,654,034 A | 8/1997 | Tulloch et al. | 427/249 |
| 5,733,043 A * | 3/1998 | Yamada et al. | 374/131 |
| 6,004,031 A * | 12/1999 | Takayama et al. | 374/131 |
| 6,241,941 B1 * | 6/2001 | Stilkerieg | 266/272 |

* cited by examiner

SELF-FLOATING DEVICE FOR MEASURING THE TEMPERATURE OF LIQUIDS

This aapplication is a provisional application of Ser. No. 60/064,200 filed Nov. 4, 1997.

FIELD OF THE INVENTION

This invention relates to a device for supporting a temperature sensor in the interior of a liquid, to a temperature sensor assembly incorporating such a device and to a method of determining the temperature of a liquid; more especially the invention is concerned with such a device, sensor assembly and method in which the temperature sensor is an immersion pyrometer for measuring the temperature of a molten metal, molten salt or other high temperature liquid.

In particular the invention is concerned with such a device, sensor assembly and method in which the device supports a hot thermocouple element, and the device floats in the liquid, whereby the hot thermocouple element may be disposed at a predetermined, desired or selected position within the liquid.

BACKGROUND OF THE INVENTION

Immersion pyrometers for measuring the temperature of a molten metal or other high temperature liquid are typically immobile and are located at a fixed position in the liquid. For example, the pyrometer may extend into the liquid through a wall of a vessel holding the liquid.

The immersion pyrometer is housed or supported in a device which protects the pyrometer from the liquid. Examples of protective devices are described in U.S. Pat. No. 5,474,618 C. Allaire; U.S. Pat. No. 5,577,841 Cowall; U.S. Pat. No. 4,692,556 T. Bollen et al and U.S. Pat. No. 5,456,761 M. Auger et al.

Since the immersion pyrometer is immobile, different parts of the pyrometer are exposed to the liquid as the level of liquid rises or falls in the vessel in which it is housed. Likewise, in the case where the liquid is a molten metal, and a slag is formed on the surface of the molten metal, rise and fall of the level of molten metal results in different parts of the pyrometer being exposed to the slag. In addition the portion of the pyrometer not immersed in the liquid and which is exposed to possible attack by the atmosphere above the liquid, varies with the rise and fall of the liquid. A further problem is that these prior pyrometers are subject to a fluctuating thermal gradient in the liquid, as well as a fluctuating liquid line level.

SUMMARY OF THE INVENTION

It is an object of this invention to provide a device for supporting a temperature sensor such as a thermocouple element for determination of the temperature of a liquid, which floats in the liquid.

It is a further object of the invention to provide a temperature sensor assembly employing a device for supporting a temperature sensor of the assembly, which device floats in a liquid, the temperature of which is to be detected.

It is yet another object of the invention to provide a method of determining the temperature of a liquid in which a device supporting a temperature sensor floats in the liquid with the temperature sensor disposed beneath the upper surface of the liquid.

According to the invention there is provided a device for supporting a temperature sensor within the interior of a liquid comprising: a sheath having an interior cavity extending from an open end to a closed end for receiving the temperature sensor, said device being adapted to float in the liquid with said closed end immersed in the liquid.

According to another aspect of the invention there is provided a temperature sensor assembly for determining the temperature of a liquid comprising: a) a temperature sensor, b) a device for housing the temperature sensor for supporting the sensor within the interior of the liquid, said device comprising a sheath having an interior cavity extending from an open end to a closed end, said temperature sensor being housed within said cavity, said device being adapted to float in the liquid with said closed end immersed in the liquid.

According to yet another aspect of the invention there is provided a method of determining the temperature of a liquid comprising: providing a bath of liquid having an upper surface, floating in said liquid a device supporting a temperature sensor, said device comprising a sheath having an interior cavity extending from an open end to a closed end, said temperature sensor being housed in said cavity at said closed end, and said closed end being immersed in said liquid, allowing the temperature of the sensor to adjust in response to the temperature of the liquid, and determining the temperature of the liquid from the adjusted sensor.

DESCRIPTION OF PREFERRED EMBODIMENTS

The invention is applicable to sensing the temperature of liquids generally, but has particular application in the sensing of the temperature of materials which are solid at normal temperatures and liquid at elevated temperatures.

In preferred embodiments the invention relates to the sensing of the temperature of molten metals and salts and is more particularly described hereinafter by reference to an especially important embodiment in which the temperature of a molten metal is to be determined.

i) Supporting Device

The supporting device of the invention, which supports a temperature sensor, for example, a hot thermocouple element, is constructed of materials and/or has design parameters such that it floats in the molten metal, with a lower portion of the device, housing the hot thermocouple element, immersed in the molten metal. In this way an upper end of the device extends above the upper surface of the molten metal, and a lower end of the device extends below the molten metal surface.

Alternatively if the device is not of a material or constructed with parameters such that it floats in the molten metal, it may employ a separate component or member which renders it floatable.

The sheath is suitably formed of a refractory material which will withstand the molten metal, and retain its structural integrity when floating in the molten metal with its lower end immersed in the molten metal.

The sheath has an internal cavity defined by an elongate bore which is closed at the lower end of the sheath and open at the upper end of the sheath.

A hot thermocouple element and its connecting lead may thus be inserted along the cavity to locate the hot thermocouple element at the closed end of the bore.

The refractory sheath thus protects the hot thermocouple element and its connecting lead. The refractory material may be a mixture of $Al_2O_3$, $SiO_2$, CaO, MgO, $ZrO_2$, AlN, SiC, $Si_3N_4$, C and the like. The selected composition is such that it confers to the refractory sheath the required resistance to corrosion by the liquid whose temperature is to be measured, as well as the required thermomechanical properties, including mechanical strength and thermal shock resistance.

The device also includes an outer protective shield surrounding the refractory sheath, for example, a metallic shield and particular reference will be made hereinafter to a metallic shield. This metallic shield is suitably in the form of a cylinder with one open end (toward the bottom part of the device) and one closed end (toward the top part of the device) through which is inserted the thermocouple element and its lead. The length of this metallic shield is at least equal to the length of the non-immersed part of the refractory shield after the later has been introduced into the liquid whose temperature is to be measured.

The metallic shield is suitably made of a pure metal or an alloy whose melting temperature should be higher than the temperature of the atmosphere located above the liquid whose temperature is being measured. If the atmosphere is oxidizing, the use of a metal or alloy having a high resistance to oxidation is preferred, such as Ni—Cr or Ni—Co alloys.

The inner diameter of the metallic shield is greater than the outer diameter of the refractory sheath. This creates a gap between the shield and the sheath. This gap, whose width or thickness is preferably less than 5 mm, is closed at one end by the closed end of the metallic shield, and at the other end by the liquid in which the device is immersed.

The metallic shield provides a number of functions including:
    a) It prevents the deterioration of the refractory sheath by the action of the atmosphere above the liquid level;
    b) It minimizes the corrosion of the refractory sheath by the action of slag or skim present on the upper surface of the liquid;
    c) It minimizes the thermal shock effect on the refractory sheath during its insertion into the liquid.

For example, refractory sheath made of materials such as $Al_2O_3/C$, $MgO/C$ or $ZrO_2/C$, are protected by the metallic shield against oxidation from the oxidizing atmosphere encountered above molten steel in a tundish. The sealed gap between the shield and the sheath becomes rapidly filled with reducing gas, during use, after the oxygen contained initially in the gap has been converted into carbon monoxide by reaction with the carbon contained inside the refractory materials. In this same example, the molten slag which is formed on the upper surface of the molten metal in the tundish, is prevented from reaching the refractory sheath by the presence of the metallic shield whose resistance to dissolution by the slag is much higher. When the device is immersed into the molten steel, the immersed lower end of the refractory sheath is exposed rapidly to a temperature of about 1500–1600° C. while the non-immersed upper end is exposed to a maximum temperature of less than about 800° C. With the presence of the surrounding metallic shield, which is highly thermally conductive as compared to the refractory sheath, the initial thermal gradient in the refractory sheath near the upper surface of the metal is reduced since the heat is conducted more rapidly toward the top of the shield.

The refractory sheath should have sufficient heat conductivity to permit the thermocouple element which is houses, to respond to the temperature of the molten metal.

In especially preferred embodiments the device is adapted to float with the closed or lower end disposed at a predetermined or selected distance below the upper surface of the liquid, for example, molten metal, in which the device floats. In this way the thermocouple element may be disposed at a desired, predetermined or selected distance below the upper surface of the liquid, so that the temperature at a desired location within the liquid can be determined.

Thus in a particularly preferred embodiment of the invention there is provided a device for supporting a thermocouple lead within the interior of a liquid the temperature of which is to be determined comprising: i) a refractory housing having an interior cavity for receiving a thermocouple lead, said housing having an upper end and a lower end, ii) an outer protective shield surrounding at least the upper end of said refractory housing, iii) means to render said device floatable in the liquid with said upper end of said refractory housing extending above the liquid, and said lower end of said refractory housing immersed in the liquid, and with said outer protective shield shielding said upper end of said refractory housing from an environment above the liquid, and iv) said refractory housing being adapted to isolate the thermocouple lead from the liquid.

ii) Temperature Sensor

The temperature sensor assembly comprises a supporting device as described hereinbefore, and a temperature sensor. In particular the temperature sensor may comprise the hot thermocouple element of a thermocouple, the hot thermocouple element being disposed in the bore of the sheath, adjacent the closed or lower end and the cold thermocouple element and related components of the thermocouple being located remote from the device and the molten metal.

As is well known the hot thermocouple element is electrically connected to the cold thermocouple element, and the potential difference between the elements, arising from their difference in temperature is measured by conventional means. The potential difference provides a parameter from which the temperature of the liquid can be determined.

The thermocouple may be made of conventional thermoelectric elements, such as Pt/Pt—Rh metals or the like, which are usually inserted inside a protective ceramic or metal shield, such as alumina or Ni—Cr or Ni—Co alloys or the like.

The hot junction of the thermocouple element is suitably in contact with the closed end of the refractory sheath.

Thus in an especially preferred embodiment of the invention there is provided a thermocouple assembly for determining the temperature of a liquid comprising: a) a thermocouple having a hot thermocouple element and a cold thermocouple element and means to determine a potential difference between said elements, b) a device supporting said hot thermocouple element within the interior of a liquid the temperature of which is to be determined, said device comprising: i) a refractory housing having an interior cavity for receiving said hot thermocouple element, said housing having an upper end and a lower end, ii) an outer protective shield surrounding at least the upper end of said refractory housing, and iii) means to render said device floatable in the liquid with said upper end of said refractory housing extending above the liquid, and said lower end of said refractory housing immersed in the liquid, and with said outer protective shield shielding said upper end of said refractory housing from an environment above the liquid, and iv) said refractory housing being adapted to isolate the hot thermocouple element from the liquid.

iii) Method of Determining Temperature

In the method of the invention the supporting device housing the temperature sensor floats in the molten metal. In this way the temperature sensor may be located at a desired, predetermined or selected distance below the upper surface of the molten metal, in a molten metal bath.

Even though the level of molten metal and thus the location of the upper surface of the molten metal, may rise and fall, the floating device will maintain the temperature at the same distance below the upper surface of the molten metal.

Thus the temperature sensor may be maintained at a constant distance from the rising and falling metal surface, within the metal bath, and the temperature at a desired location within the metal bath may thus be monitored continuously over a long period.

Thus in a particular embodiment of the invention there is provided a method of monitoring the temperature of a liquid comprising: A) providing a thermocouple assembly having a hot thermocouple element, a cold thermocouple element and means to determine a potential difference between said elements. B) isolating said hot thermocouple element within an interior cavity of a refractory housing having an upper end and a closed lower end, at least said upper end being surrounded by an outer protective shield, said refractory housing and said outer protective shield defining a flotation device, C) floating said device in said liquid with said lower end of said refractory housing immersed in said liquid and said upper end extending above said liquid such that said outer protective shield shields said upper end from an environment above the liquid, D) allowing the temperature of the hot thermocouple element to adjust in response to the temperature of the surrounding liquid, and E) measuring the potential difference between said hot and cold elements at the cold ends of the leads therefrom and determining the temperature of the liquid therefrom.

DESCRIPTION OF PREFERRED EMBODIMENT WITH REFERENCE TO THE DRAWINGS

Figure 1:
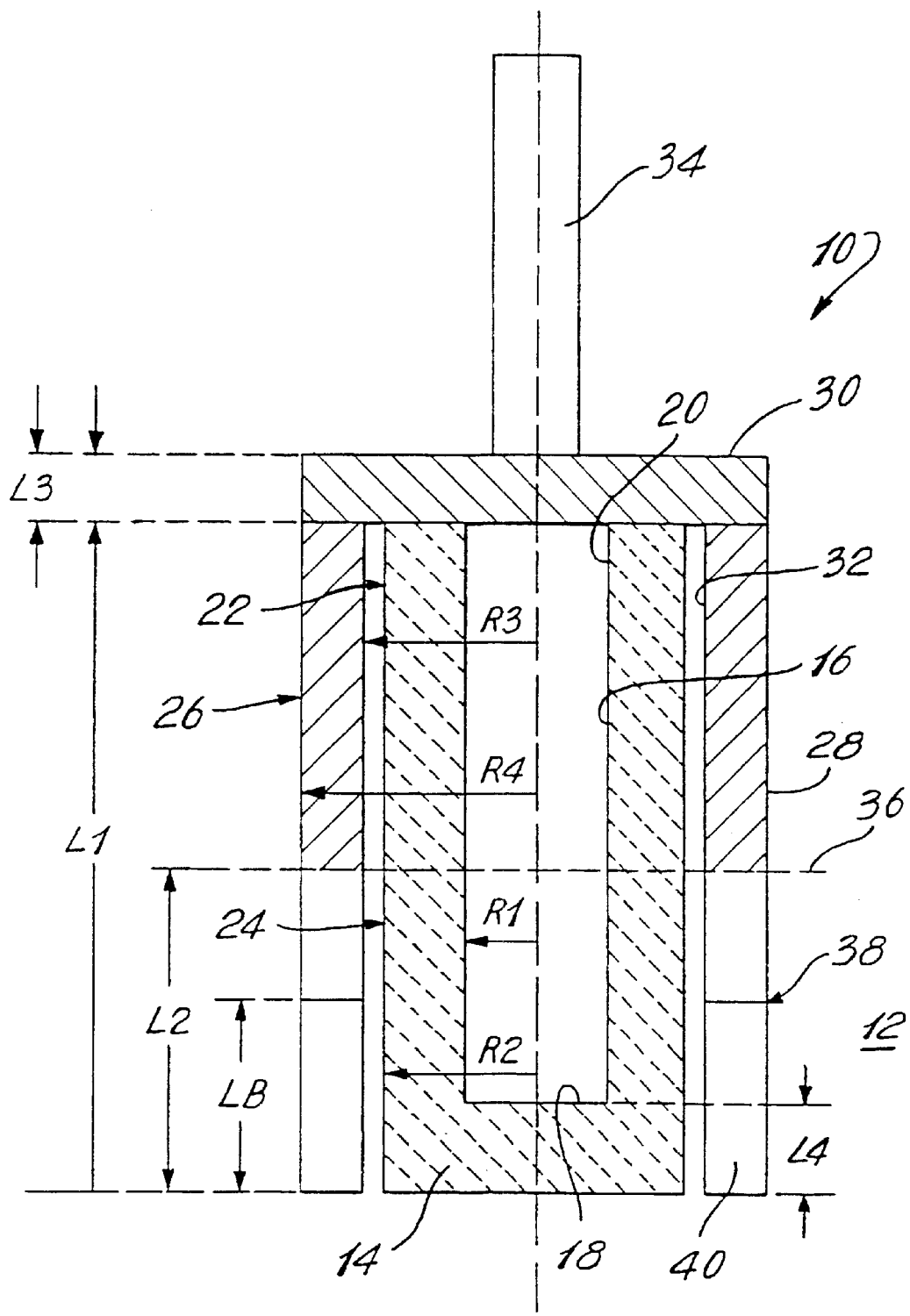
FIG. 1 schematic representation of a floating support device of the invention.

With further reference to FIG. 1, there is shown a device 10 of the invention in a molten metal 12.

Device 10 includes a refractory sheath 14 having an internal bore or cavity 16 having a blind or closed end 18 and an open end 20. Device 10 has an upper end 22 and a lower end 24.

A metallic shield 26 surrounds upper end 22 of sheath 14. Metallic shield 26 includes a peripheral or circumscribing wall 28 and a roof 30. An inner face of wall 28 is spaced from an outer face of upper end 22 by a gap 32.

A lead or extension wire 34 of the thermocouple (not shown) extends through roof 30 into bore 16 to locate a hot thermocouple element (not shown) at the closed end 18 of bore 16.

The molten metal 12 forms a bath having an upper surface 36. Device 10 thus floats in molten metal 12 with lower end 24 of refractory sheath 14 immersed in the molten metal 12 and upper end 22 of refractory sheath 14 extending above the upper surface 36 of molten metal 12.

The peripheral wall 28 of metallic shield 26 extends upwardly from upper surface 36, and protects upper end 22 from the environment above 25 metal surface 36, which environment may include slag (not shown) floating on the surface 36, and an oxidizing atmosphere above surface 36.

There is further shown in FIG. 1, a lower part 38 of shield 26 which has been dissolved by the molten metal 12 as a result of immersion, including a buffer 40.

In particular, metallic shield 26 is of a material which dissolves or melts when immersed in molten metal 12, and sheath 14 is of a material subject to deterioration on exposure to an environment above the molten metal 12.

Various parameters are shown in FIG. 1 which are explained in Table 1.

TABLE 1

LIST OF THE PARAMETERS

| PARAMETERS | DESCRIPTION |
|---|---|
| RADIUS | |
| R1 | Internal radius of the refractory sheath; |
| R2 | External radius of the refractory sheath; |
| R3 | Internal radius of the metallic shield; |
| R4 | External Radius of the metallic shield. |
| LENGTH | |
| L1 | Length of the refractory sheath; |
| L2 | Immersion depth of the refractory sheath; |
| L3 | Thickness of the top part of the metallic shield; |
| L4 | Thickness of the bottom part of the refractory sheath; |
| LB | Length of the "BUFFER". |
| WEIGHT | |
| W1 | Weight of the refractory sheath; |
| W2 | Weight of the non-immersed lateral part of the metallic shield; |
| W3 | Weight of the top part of the metallic shield; |
| WE | Weight of the extension wire |
| DENSITY | |
| D1 | Density of the refractory sheath; |
| D2 | Density of the metallic shield; |
| DL | Density of the liquid (whose temperature has to be measured); |
| DB | Density of the "BUFFER". |

When device 10 is introduced to its floating position in molten metal 12, the immersed portion 38 of metallic shield 26 dissolves or melts in the molten metal 12. If the density of shield 26 is greater than the density of the molten metal the resulting loss in weight of device 10 would be greater than the drop in the upward force exerted by the molten metal 12; the upward force being equal to the weight of the molten metal 12 in a volume equal to that of the immersed portion 38 (Archimedes Principle). In this case the device 10 would rise (climb) until its immersion volume reached a value such that the upward force exerted by molten metal 12 would equal the new lower weight of device 10 (without portion 38).

The buffer 40 is employed so that the overall density of the immersed portion 38 (of shield 26) is less than, or equal, to that of the molten metal 12. Buffer 40 is of a material that is soluble in or has a lower melting temperature than the molten metal 12, and whose density is less than that of shield 26.

iv) Flotation

Any means of rendering the supporting device floatable may be employed provided that their employment is not inconsistent with the intended use of the supporting device. Two methods available depend on the density of the liquid, the temperature of which is to be determined.

CASE 1

The density of the liquid whose temperature is to be measured is such that any combination of the parameters listed on FIG. 1 and Table 1, (i.e., L1, L2, L3, L4, LB, R1, R2, R3, R4, WE, D1, D2, DL and DB) fails to render the device self-floating with the required immersion depth (typically greater than 15 cm). This is typically the case with low density liquids having a density of less than 4 g/cm$^3$.

In such a case, a float may be fixed to the device. The float could be made of ceramic fibers, such as insulating boards, or porous refractories, such as insulating castables, having a low density, typically less than 0.5 g/cm$^3$. The latter case is shown, as an example, in FIG. 2.

Figure 2:
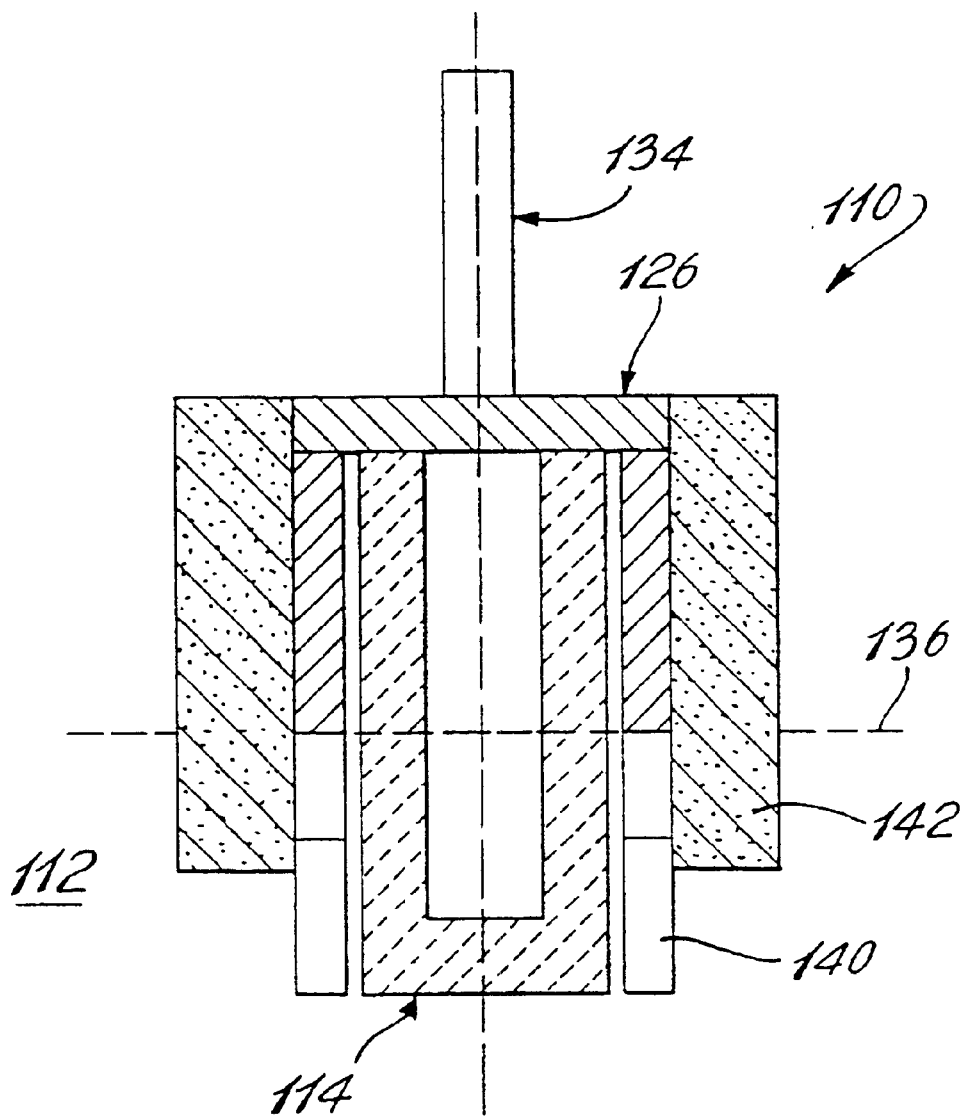
FIG. 2 is a schematic representation of a floating support device the invention in another embodiment.

With further reference to FIG. 2 a support device 110 includes a sheath or refractory sheath 114, a metallic shield 126 and a float 142 engages the outer wall of shield 126.

In general the device 110 shown in FIG. 2, is the same as device 10 shown in FIG. 1, with the addition of Float 142. The parts of device 110 which are the same as those in FIG. 1 bear the same identifying integers but increased by 100.

The material used as the float 142 should be resistant to corrosion by the liquid in which it is partially immersed. The dimensions of the float 142 are such that float 142 permits the desired immersion depth of the lower end 124 of sheath 114.

CASE 2

In this preferred embodiment the density of the liquid whose temperature is to be measured is such that there exists a combination of the parameters listed on FIG. 1 and Table 1, (i.e., L1, L2, L3, L4, LB, R1, R2, R3, R4, WE, D1, D2, DL and DB) whereby the device is rendered self-floating, with the desired immersion depth (typically greater than 15 cm) of lower end 24. This is typically the case for liquids having a high density greater than 4 g/cm$^3$.

In such a case, the relationship between the above parameters is given by the following equation (see Table 1):

$$P = WT = W1 + W2 + W3 + WE \quad (1)$$

where:

$$P = (DL)\pi(R2)^2(L2) \quad (2)$$

$$W1 = (D1)\pi[(R2)^2(L1) - (R1)^2(L1) + (R1)^2(L4)] \quad (3)$$

$$W2 = (D2)\pi[(L1) - (L2)][(R4)^2 - (R3)^2] \quad (4)$$

$$W3 = (D2)\pi(R4)^2(L3) \quad (5)$$

P is the Archimedian upthrust.

WT is the overall weight of the device after partial immersion to a floating position.

If the metallic shield 26 is soluble or melts in the liquid in which it is immersed, a buffer 40 such as shown on FIG. 1 should be used to prevent the rising of the device 10 after its first immersion. In such a case, the required length of the buffer 40 (LB) is given by the following equation (see Table 1):

$$LB \geq \frac{[(D2) - (DL)](L2)}{[(D2) - (DB)]} \quad (6)$$

Otherwise, the rising or elevation of the device 10 above surface 36 would cause two problems:

1) The impossibility of measuring the liquid temperature at predetermined locations below surface 36;

2) The exposure of the refractory sheath 14 near the top of the liquid, to the atmosphere as well as to the slag or skim that may be present, i.e., the environment above surface 36.

The need for buffer 40 in the above conditions is also applicable for "CASE 1" above.

Figure 3:
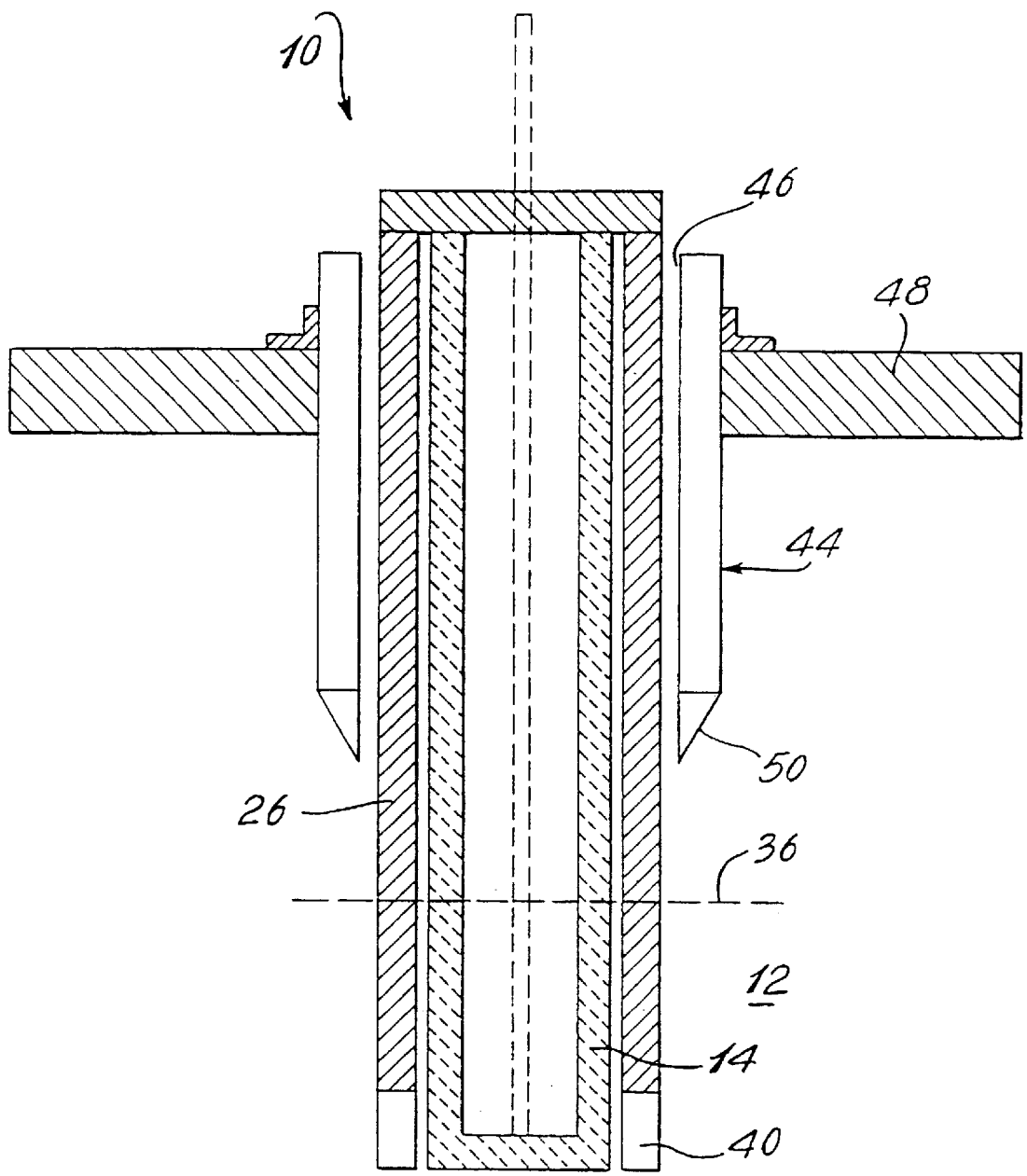
FIG. 3 is a representation of a device of the invention a guide member.

With further reference to FIG. 3, there is shown a device 10 of FIG. 1 floating in molten metal 12. The device 10 is maintained vertical by a tubular guide 44 which extends through an opening 46 in a cover 48 of a vessel (not shown) housing the molten metal 12.

Tubular guide 44 has an inwardly tapered lower end 50 which facilitates removal of slag from device 10 as it is withdrawn from the vessel.

EXAMPLE 1

This example is to show how equations (1) to (6) can be used to calculate the dimensions of each component in FIG. 1, permitting to achieve a self-floating device for measuring the temperature of molten steel in a tundish, at 16 in. (40.64 cm) from the top of the liquid metal.

Consider the following values:

R2=3.175 cm (1¼ in.)

R3=3.275 cm (i.e., (R3)−(R2)=1 mm)

W1=4.761 Kg

WE=0 (i.e., no extension wire)

DL=7 g/cm$^3$ (i.e., lower limit for the density of molten steel)

D2=8.08 g/cm$^3$ (i.e., density of "HR-160" alloy*)

DB=2.7 g/cm$^3$ (i.e., density of aluminum)

L1=76 cm (~30 in.)

L2=40.64 cm (16 in.)

L3=0.635 cm (¼ in.)

(*: a "Ni—Co" alloy sold by Haynes International Inc., Kokomo. Ind., U.S.A.)

From equations (1) to (5):

$$(R4)^2 = \frac{(DL)\pi(R2)^2(L2) + (D2)\pi[(L1) - (L2)](R3)^2 - [(W1) + (WE)]}{(D2)\pi[(L1) - (L2) + (L3)]} \quad (7)$$

$$===> R4 = 3.90 \text{ cm}$$

Thus, the required thickness (T) of the metallic shield is:

$$T = (R4) - (R3) = 0.625 \text{ cm } (0.25 \text{ in.})$$

Finally, the length of the buffer is given by equation (6) and is:

$$LB \geq 8.16 \text{ cm.}$$

EXAMPLE 2

This example is to show that a buffer is effectively required when the metallic shield is soluble or melts in the liquid in which it is immersed.

The climb or rise (δ) of the device after its first immersion into such a liquid, when no buffer is used, is given by the following equation:

$$\delta = \frac{(x-1)(WT)(A2)}{(DL)[(A1) + (A2)](A1)} \quad (8)$$

where:

$$x = (D2)/(DL)$$

and:
- WT=Initial total weight of the device before its immersion;
- A1=External section of the refractory sheath;
- A2=Section of the lateral part of the metallic shield;
- D2=Density of the metallic shield;
- DL=Density of the molten metal.

Considering the same values as in Example 1:

$$\delta = 2.84 \text{ cm.}$$

According to equation (8), the immersion level of the device is kept constant during the dissolution or melting of the metallic shield, only when its density (D2) is equal to the density of the liquid (DL).

EXAMPLE 3

This example is to show that the use of a metallic shield is required to protect the refractory sheath against the action of the atmosphere which is located on top of the liquid whose temperature is to be measured.

A first device according to FIG. 1 was made but without the use of a metallic shield. The refractory sheath was made of a MgO/C refractory material. This device was immersed at a constant level in molten cast-iron which was contained inside an induction furnace operating at about 1500° C. The results obtained showed that the refractory sheath was, during the test, subjected to severe oxidation above the metal line and that its expected life in such conditions was only about 12 hours.

A second device according to FIG. 1 was made using the same refractory material as above but with the use of a metallic sheath made of "HR-160" alloy and having a thickness of ¼ in. This device was tested as for the first device. The test was started by inserting the device into the molten metal for 12 hours at a constant immersion depth. Then the device was taken out and allowed to cool down. After cooling, the device was inserted again into the molten metal but one inch deeper. The new position was kept constant during 18 hours. After that period, the device was removed from the molten metal and allowed to cool at room temperature. After cooling the metallic shield was removed and the refractory shield was inspected visually. No sign of oxidation was observed in the part of the refractory sheath that was located above the molten metal during this 30 hour test.

It should be noted that molten slag was also present at the metal line during the above tests. No sign of corrosion of the refractory shield was observed during the latter test of the second device at the metal line level.

EXAMPLE 4

Figure 4:
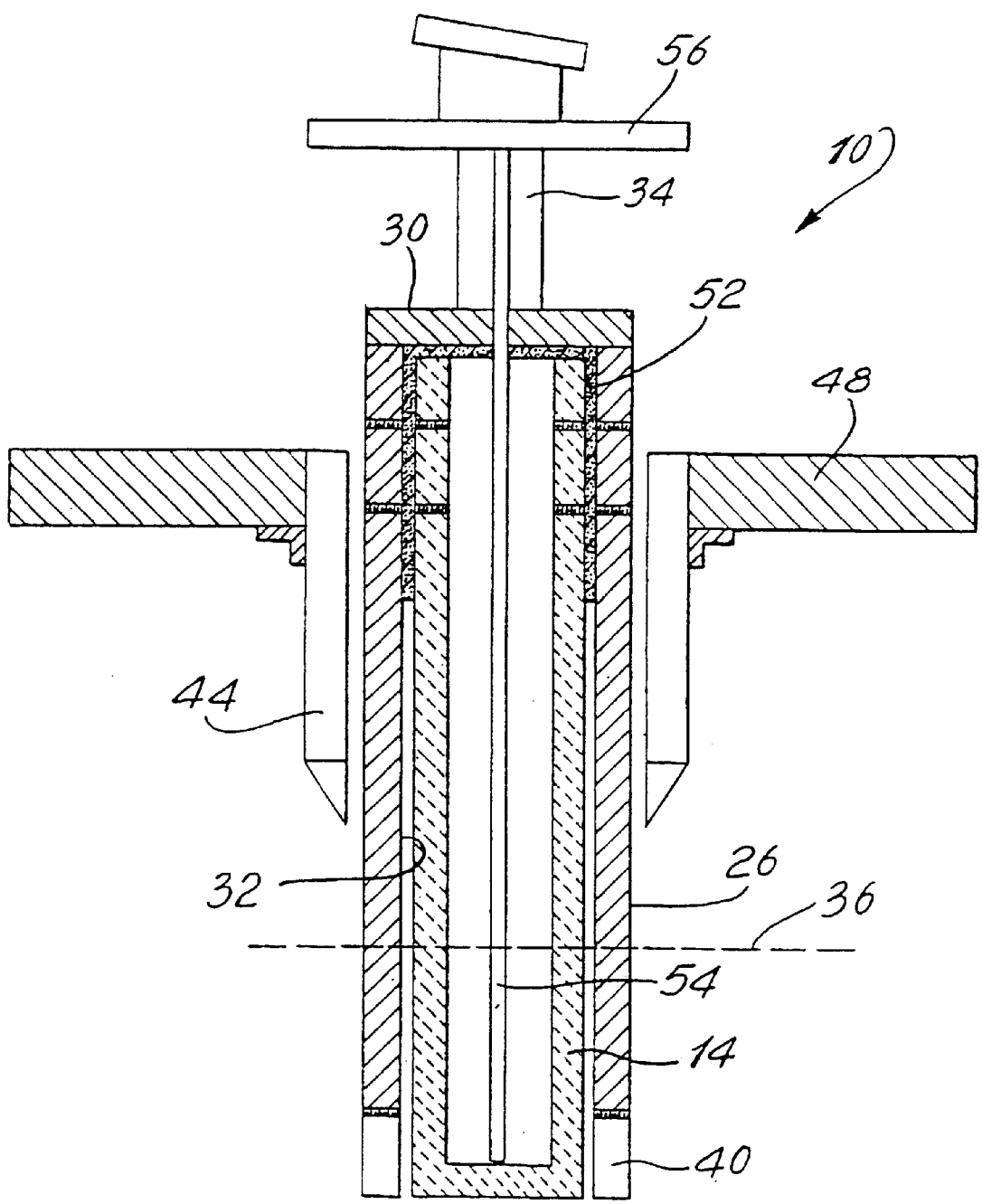
FIG. 4 is a schematic representation of a device of the invention as shown in FIG. 3 as employed in a test in a tundish.

The device 10 illustrated in FIG. 4 was inserted vertically with the aid of the guide 44 in molten steel in a tundish for 262 minutes. The refractory sheath 14 was fabricated from a mixture of alumina and carbon (the sheath 14 is commercially available from Vesuvius Crucible). During the test, the molten steel height in the tundish varied from 23 to 31 inches, and the corresponding variation in the weight of molten steel in the tundish was 14.75 to 16.50 tonnes. The molten steel was at a temperature of about 1565° C., and was covered by a layer of slag having a thickness of about 5 inches. The device 10 floated in the molten steel and maintained an immersion depth of about 15 inches, which was close to the calculated 13.75 inches.

At the completion of the test, the device 10 was examined and the following results were achieved:
i) the non-melted portion of metallic shield 26 coincided with the non-immersed part of device 10, as was expected;
ii) in the non-immersed part of the device 10, the refractory sheath 14 did not oxidize, as was expected; and
iii) the dissolution of the refractory sheath 14 in contact with the slag layer was about 4 times less than that usually observed employing the same refractory sheath in a fixed, non-floating, position.

This demonstrates that the floating device 10 not only enhances the oxidation resistance of the refractory sheath 14 above the liquid line, but also reduces corrosion by slag of the refractory sheath 14.

This corrosion protection may be explained by the fact that the absence of oxidation of the refractory sheath 14 at the liquid line prevents loss of carbon from the sheath 14, and hence prevents creation of pores, thereby reducing penetration of slag into the sheath 14. Additionally, the absence of significant immersion depth variation of the sheath 14, in that it floats at a relatively constant immersion depth, reduces the thermal cycles, in the region of the liquid line, to which the sheath 14 is exposed (typically the atmosphere above the liquid line or level in the tundish is less than 1000° C.). In this way the sheath 14 experiences reduced thermal shock as compared with a fixed, non-floating device whereby microcrack formation at the surface of sheath 14 is reduced, so that penetration of slag is reduced.

With further reference to FIG. 4, insofar as the same parts appear in FIG. 3, the same integers are employed.

Thus device 10 is maintained vertically disposed in the molten steel 12 in the tundish by the tubular guide 44 which is mounted in the cover 48 of the tundish.

An alumina mortar 52 is disposed in the gap 32 between refractory sheath 14 and metallic shield 26, in an upper region.

A steel extension 34 supports a thermocouple element 54. Extension 34 extends from a steel stopper 56.

The metallic shield 26 is of steel 316, has an internal diameter of 7 cm and a thickness of 0.3175 cm. The guide 44 is also of steel 316 and has an internal diameter of 8.03 cm and a thickness of 0.635 cm, buffer 40 has a length of 17.78 cm. The refractory sheath 14 has a length of 76.2 cm and an external diameter of 6.8 cm.

Guide 44 has a vertical length 15.24 cm below cover 48.

Device 10 has an immersion depth below the molten metal level of 35 cm.

Gap 32 has a width of 1 mm; roof 30 is 12.7 cm below steel stopper 56 which is of steel 316 and has a thickness of 0.635 cm and a diameter of 9.3 cm.

A 2 mm gap is defined between guide 44 and metallic shield 26.

What is claimed is:

1. A self-floating device for supporting a temperature sensor within the interior of a liquid comprising:
   a sheath having an interior cavity extending from an open end to a closed end for receiving the temperature sensor and having a refractory housing being adapted to isolate the thermocouple lead from the liquid, said device floating in the liquid without any floating means coupled thereto, with said closed end immersed in the liquid, said device being adapted for disposing said closed end at a selected distance below an upper surface of the liquid in which the device floats, an outer protective shield surrounding at least the open end of said refractory housing and adapted to dissolve or melt when immersed in the liquid; and said device floating in the liquid with said open end of said refractory housing extending above an upper surface of the liquid, and said closed end of said refractory housing being immersed in the liquid, and with said outer protective shield shielding said open end of said refractory housing from an environment above the liquid.

2. A device according to claim 1 wherein the sheath comprises $Al_2O_3/C$, $MgO/C$, $ZrO_2/C$, $CaO$, $SiO_2$, $AlN$, $SiC$, $Si_3N_4$, C and mixtures thereof.

3. A device according to claim 2 wherein the sheath comprises $Al_2O_3/C$, $MgO/C$ or $ZrO_2/C$.

4. A device according to claim 1 wherein the temperature sensor comprises a thermocouple lead.

5. A device according to claim 1 wherein said outer protective shield comprises a metallic shield.

6. A temperature sensor assembly for determining the temperature of a liquid comprising a temperature sensor, a self-floating device housing the temperature sensor for supporting the sensor within an interior of the liquid, said device comprising a sheath having an interior cavity extending from an open end to a closed end thereof, said temperature sensor being housed within said cavity, said device being adapted to float in the liquid with said closed end immersed in the liquid and at a selected distance below an upper surface of the liquid, an outer protective shield surrounding at least the open end of said sheath and adapted to dissolve or melt when immersed in the liquid, said device floating in the liquid with said open end of said sheath extending above an upper surface of the liquid, and said closed end of said sheath being immersed in the liquid, and with said outer protective shield shielding said open end of said sheath from an environment above the liquid.

7. An assembly according to claim 6 wherein the sheath comprises $Al_2O_3/C$, $MgO/C$, $ZrO_2/C$, $CaO$, $SiO_2$, $AlN$, $SiC$, $Si_3N_4$, C and mixtures thereof.

8. An assembly according to claim 7 wherein the sheath comprises $Al_2O_3/C$, $MgO/C$ or $ZrO_2/C$.

9. An assembly according to claim 6 wherein the temperature sensor is a thermocouple which comprises a hot thermocouple element and a cold thermocouple element and means to determine a potential difference between said elements.

10. An assembly according to claim 6 wherein said sheath comprises a refractory housing.

11. An assembly according to claim 6 wherein said outer protective shield comprises a metallic shield.

* * * * *

UNITED STATES PATENT AND TRADEMARK OFFICE
CERTIFICATE OF CORRECTION

PATENT NO. : 6,679,627 B1
DATED : January 20, 2004
INVENTOR(S) : Claude Allaire

It is certified that error appears in the above-identified patent and that said Letters Patent is hereby corrected as shown below:

<u>Column 5,</u>
Lines 31-36, should read as
-- FIG. 1 is a schematic representation of a floating support device of the invention;
FIG. 2 is a schematic representation of a floating support device of the invention in another embodiment;
FIG. 3 is a schematic representation of a device of the invention in use, with a guide member; and --
Line 65, "25" is deleted, <u>Column 8,</u>
Line 61, should read as follows: -- LB $\geq$ 8.16 cm. --

Signed and Sealed this

First Day of June, 2004

JON W. DUDAS
*Acting Director of the United States Patent and Trademark Office*